US012442855B1

(12) United States Patent
Hunt-Schroeder et al.

(10) Patent No.: US 12,442,855 B1
(45) Date of Patent: Oct. 14, 2025

(54) BUILT-IN CIRCUIT FOR TESTING PROCESS AND LAYOUT EFFECTS OF AN INTEGRATED CIRCUIT DIE

(71) Applicant: Marvell Asia Pte Ltd, Singapore (SG)

(72) Inventors: Eric D. Hunt-Schroeder, Essex Junction, VT (US); Steven Harley Lamphier, Colchester, VT (US); Dale E. Pontius, Colchester, VT (US); Christopher Kanyuck, Lakeland, FL (US)

(73) Assignee: MARVELL ASIA PTE LTD, Singapore (SG)

( * ) Notice: Subject to any disclaimer, the term of this patent is extended or adjusted under 35 U.S.C. 154(b) by 48 days.

(21) Appl. No.: 18/304,501

(22) Filed: Apr. 21, 2023

Related U.S. Application Data

(60) Provisional application No. 63/335,259, filed on Apr. 27, 2022.

(51) Int. Cl.
*G01R 31/28* (2006.01)
*G01R 31/307* (2006.01)
*H01L 21/66* (2006.01)

(52) U.S. Cl.
CPC .......... *G01R 31/2884* (2013.01); *H01L 22/34* (2013.01)

(58) Field of Classification Search
CPC .. G06F 3/0447; G01R 31/2884; G01R 31/307
See application file for complete search history.

(56) References Cited

U.S. PATENT DOCUMENTS

| 6,429,029 | B1* | 8/2002 | Eldridge | H01L 24/06 257/E23.068 |
| 7,239,163 | B1* | 7/2007 | Ralston-Good | G01R 31/2884 438/18 |
| 2009/0212793 | A1* | 8/2009 | Guldi | H01L 22/14 257/E23.002 |
| 2009/0243645 | A1* | 10/2009 | Shinkawata | G01R 31/2884 324/750.16 |
| 2010/0045329 | A1* | 2/2010 | Staudt | G01R 31/3161 324/762.01 |
| 2011/0121856 | A1* | 5/2011 | Tseng | G01R 31/31816 326/35 |
| 2013/0132023 | A1* | 5/2013 | Bhavnagarwala | G01R 31/2884 702/118 |
| 2020/0057013 | A1* | 2/2020 | Howard | G01R 31/2822 |
| 2020/0064397 | A1* | 2/2020 | Wang | G01R 31/31908 |

* cited by examiner

Primary Examiner — Huy Q Phan
Assistant Examiner — Temilade S Rhodes-Vivour

(57) ABSTRACT

An integrated circuit device includes functional circuitry including transistors, and testing circuitry configured to test effects of different layouts of the functional circuitry, relative to physical features of the integrated circuit device, on operation of the transistors. The testing circuitry includes at least one first test circuit having a first physical relationship relative to the physical features of the integrated circuit device, at least one second test circuit having a second physical relationship, different from the first physical relationship, relative to the physical features of the integrated circuit device, and sensing circuitry for reading outputs of the at least one first test circuit and the at least one second test circuit. Imbalance circuitry is configured to apply compensation to the functional circuitry to compensate for a sensed imbalance. There may be a plurality of instances of the first test circuit, and a plurality of instances of the second test circuit.

20 Claims, 9 Drawing Sheets

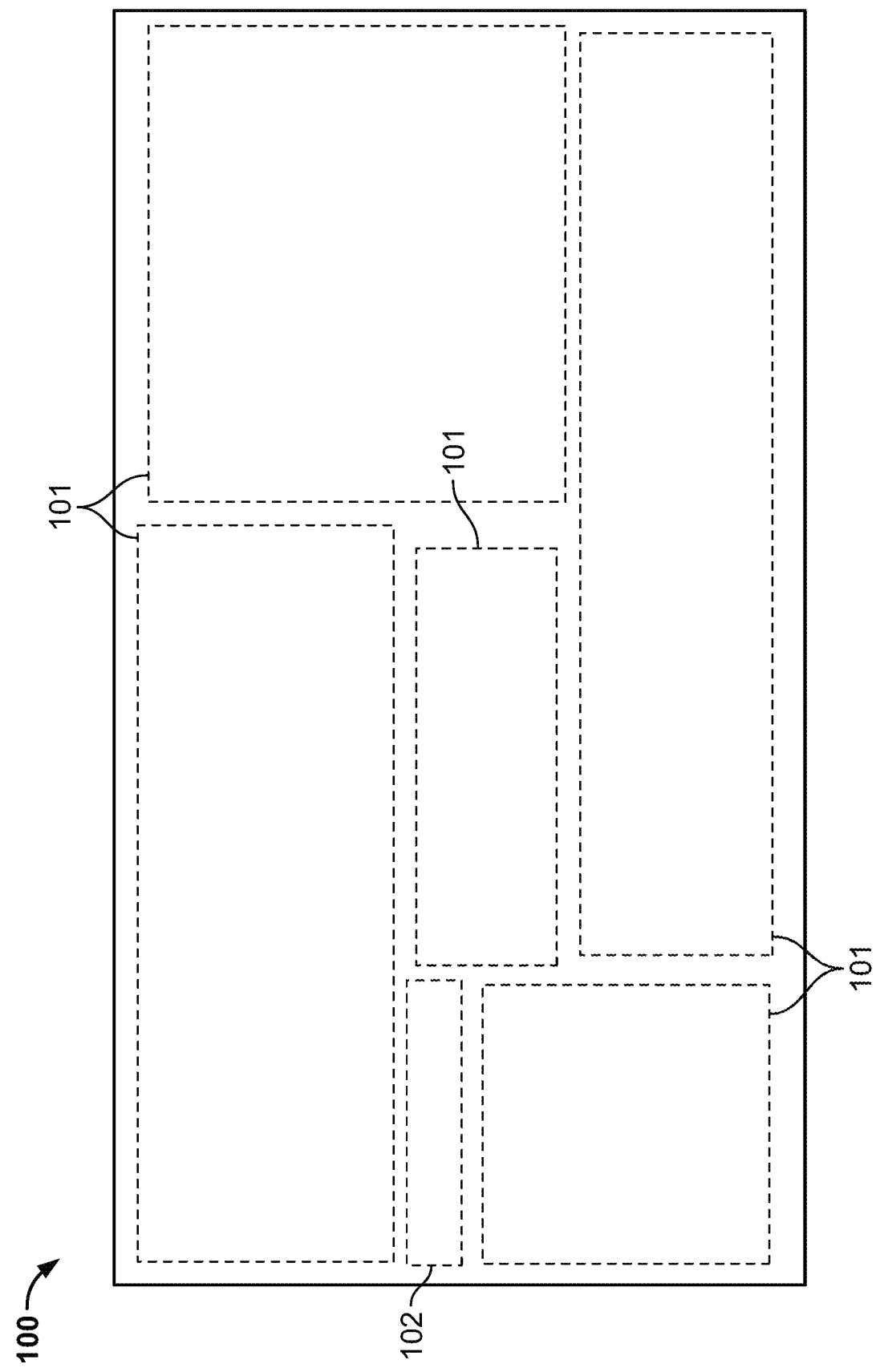

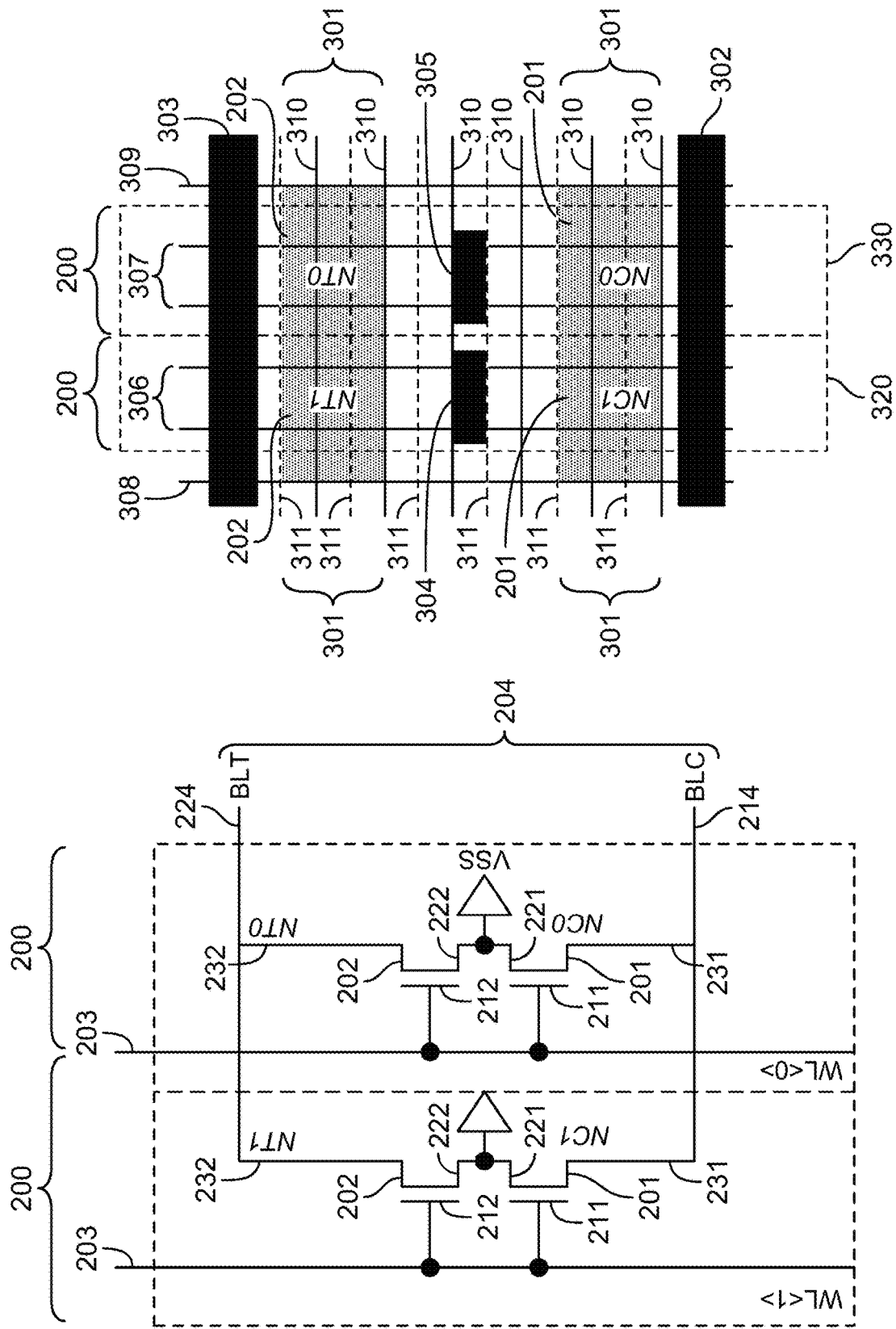

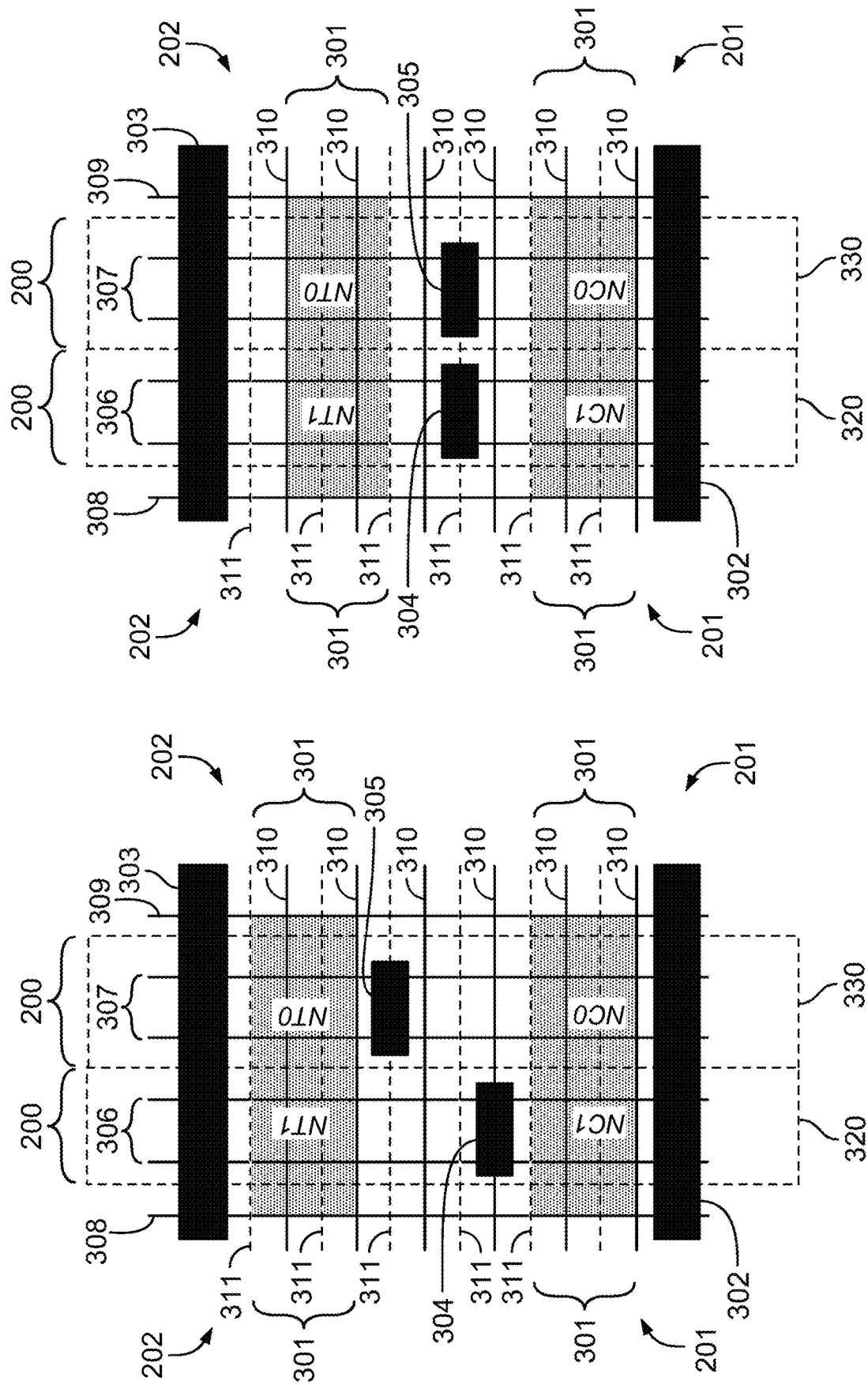

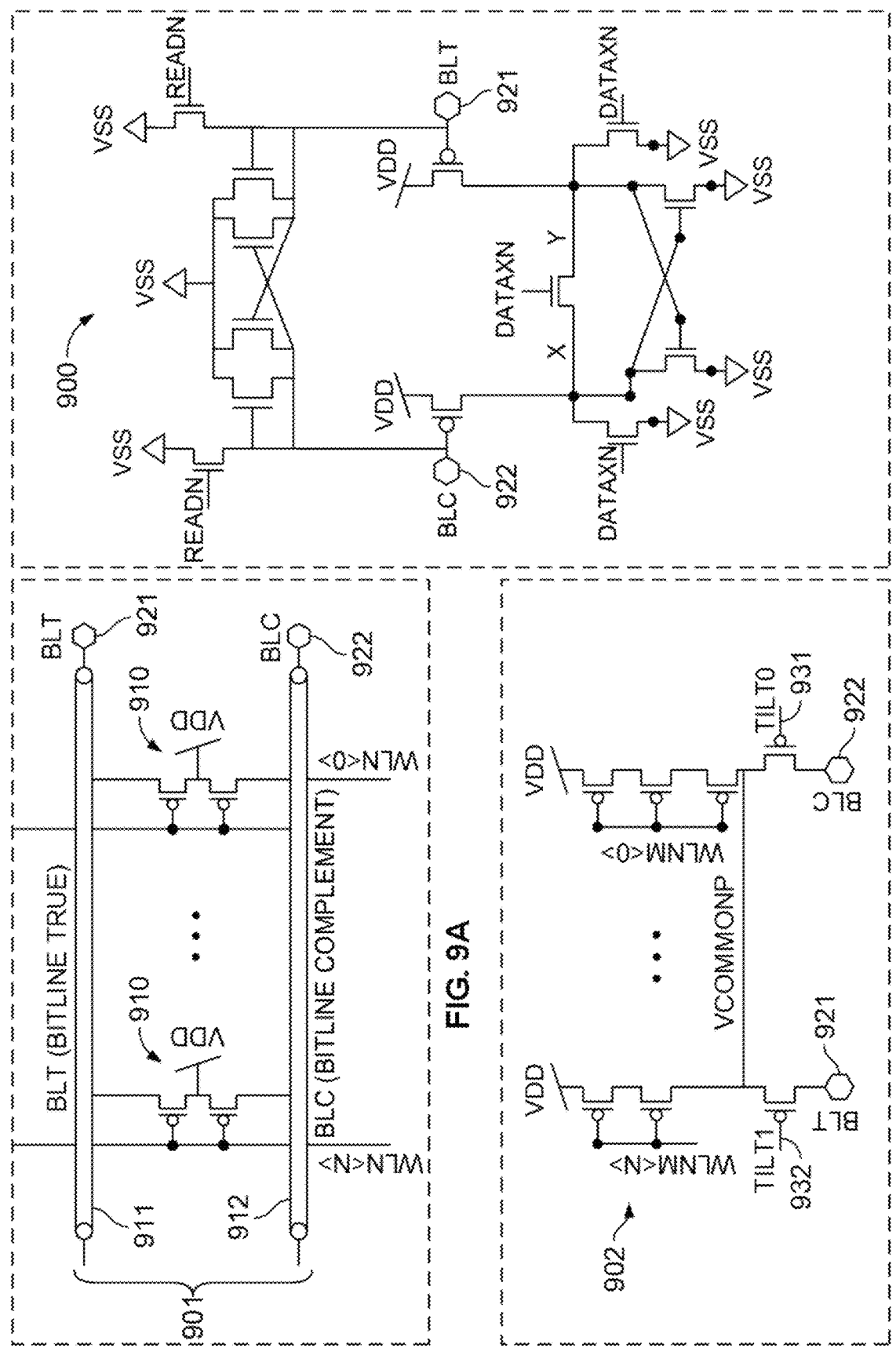

BUILT-IN CIRCUIT FOR TESTING PROCESS AND LAYOUT EFFECTS OF AN INTEGRATED CIRCUIT DIE

CROSS REFERENCE TO RELATED APPLICATION

This disclosure claims the benefit of commonly-assigned U.S. Provisional Patent Application No. 63/335,259, filed Apr. 27, 2022, which is hereby incorporated by reference herein in its entirety.

FIELD OF USE

This disclosure relates to built-in circuitry for testing integrated circuit devices. More particularly, this disclosure relates to built-in circuitry that allows testing of the effect of fabrication conditions of an integrated circuit device on components fabricated on that device, and especially the effects of different layout selections on the fabricated components.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Various artifacts of semiconductor processing conditions may affect the operation of components formed on a semiconductor device. While in most cases, the effects are small, the effects—even if small—may be significant in certain applications, such as where matched pairs of transistors are expected to be balanced in their performance.

SUMMARY

In accordance with implementations of the subject matter of this disclosure, an integrated circuit device includes functional circuitry including transistors, testing circuitry configured to test effects of different layouts of the functional circuitry, relative to physical features of the integrated circuit device, on operation of the transistors. The testing circuitry includes at least one first test circuit having a first physical relationship relative to the physical features of the integrated circuit device, at least one second test circuit having a second physical relationship, different from the first physical relationship, relative to the physical features of the integrated circuit device, and sensing circuitry configured to read outputs of (a) the at least one first test circuit and (b) the at least one second test circuit. Imbalance circuitry is configured to apply compensation to the functional circuitry to compensate for a sensed imbalance.

In a first implementation of such an integrated circuit device, the at least one first test circuit may include a plurality of instances of the first test circuit, and the at least one second test circuit may include a plurality of instances of the second test circuit.

According to a first aspect of that first implementation, the plurality of instances of the first test circuit, and the plurality of instances of the second test circuit may be part of an array including instances of additional test circuits.

In a second implementation of such an integrated circuit device, the integrated circuit device may be a finFET device, and the physical features may include fins of different strengths.

In a third implementation of such an integrated circuit device, the physical features may include gate contact locations.

In a fourth implementation of such an integrated circuit device, the physical features may include lengths of diffusion regions.

In a fifth implementation of such an integrated circuit device, the physical features may include polysilicon cuts that define ends of transistors.

In a sixth implementation of such an integrated circuit device, at least one of the at least one first test circuit and the at least one second test circuit may include a balanced twin-transistor bitcell, including two nominally identical transistors sharing a common gate and a common source, and the sensing circuitry may include a sense amplifier.

According to a first aspect of that sixth implementation, the sense amplifier may be configured to detect imbalance between response of a selected parameter in (a) a first of the two nominally identical transistors and (b) a second of the two nominally identical transistors, and the imbalance circuitry may be configured to measure the imbalance and apply compensation for the imbalance to the functional circuitry.

In a first instance of that first aspect, the imbalance circuit may be configured to measure the imbalance by determining a bias voltage that negates the imbalance, and to apply that bias voltage to the functional circuitry.

In a second instance of that first aspect, the selected parameter is one of current, voltage, capacitance, and inductance.

In accordance with implementations of the subject matter of this disclosure, a method of testing effects of layout of functional circuitry of an integrated circuit device, relative to physical features of the integrated circuit device, on transistors of the functional circuitry, includes providing, on the integrated circuit device, testing circuitry including at least one first test circuit having a first physical relationship relative to physical features of the integrated circuit device, and at least one second test circuit having a second physical relationship relative to the physical features of the integrated circuit device. Imbalance is sensed in at least one of (a) the at least one first test circuit and (b) the at least one second test circuit; and applying compensation to the functional circuitry to compensate for a sensed imbalance.

In a first implementation of such a method, for each respective one of the at least one first test circuit and the at least one second test circuit, sensing imbalance may include sensing imbalance between response of a selected parameter in a first of two nominally identical components of the respective one of the at least one first test circuit and the at least one second test circuit, and a second of the two nominally identical components of the respective one of the at least one first test circuit and the at least one second test circuit.

According to a first aspect of that first implementation, sensing imbalance may include sensing imbalance in at least one of current, voltage, capacitance, and inductance.

In a second implementation of such a method, applying compensation may include adjusting circuit parameters to compensate for the imbalance.

In a third implementation of such a method, applying compensation may include redesigning the integrated circuit device to mitigate the imbalance.

According to a first aspect of that third implementation, when the integrated circuit device is a finFET device and the physical features include fins of different strengths, redesigning the integrated circuit device to mitigate the imbalance may include moving layout location of transistors of the functional circuitry relative to the fins.

According to a first aspect of that third implementation, when the physical features include gate contact locations, redesigning the integrated circuit device to mitigate the imbalance may include changing the gate contact locations.

In a fourth implementation of such a method, when the physical features include lengths of diffusion regions, redesigning the integrated circuit device to mitigate the imbalance may include changing the lengths of diffusion regions.

In a fifth implementation of such a method, when the physical features include polysilicon cuts that define transistor edges, redesigning the integrated circuit device to mitigate the imbalance may include moving the polysilicon cuts relative to diffusion regions of the transistors.

In accordance with implementations of the subject matter of this disclosure, an integrated circuit device having physical features forming diffusion regions of different relative strengths includes a balanced bitcell spanning, in a first direction, a first area of the integrated circuit device and a second area of the integrated circuit device, and spanning, in a second direction perpendicular to the first direction, a first diffusion region of the integrated circuit device and a second diffusion region of the integrated circuit device, the first diffusion region of the integrated circuit device and the second diffusion region of the integrated circuit device having different relative strengths, the balanced bitcell including a first transistor having a first portion in the first area of the integrated circuit device in the first diffusion region and a second portion in the second area of the integrated circuit device in the second diffusion region, and a second transistor having a third portion in the first area of the integrated circuit device in the second diffusion region and a fourth portion in the second area of the integrated circuit device in the first diffusion region.

In a first implementation of such an integrated circuit device, the first area of the integrated circuit device and the second area of the integrated circuit device are adjacent one another, having a boundary extending in a first direction, and any line drawn through the first portion of the first transistor parallel to the boundary passes through the first portion of the second transistor but not through the second portion of the first transistor, and any line drawn through the second portion of the second transistor parallel to the boundary passes through the second portion of the first transistor but not through the first portion of the second transistor.

In a second implementation of such an integrated circuit device, the integrated circuit device may be a finFET device and the physical features forming diffusion regions of different relative strengths may include fins of different strengths, the first diffusion region of the integrated circuit device may have a first relative location to the fins of different strengths, and the second diffusion region of the integrated circuit device may have a second relative location to the fins of different strengths.

In accordance with implementations of the subject matter of this disclosure, a balanced bitcell, formed on an integrated circuit device having physical features forming diffusion regions of different relative strengths, includes a first transistor having a first portion in the first area of the integrated circuit device in a first diffusion region and a second portion in the second area of the integrated circuit device in a second diffusion region, and a second transistor having a third portion the first area of the integrated circuit device in the second diffusion region and a fourth portion in the second area of the integrated circuit device in the first diffusion region, the first diffusion region of the integrated circuit device and the second diffusion region of the integrated circuit device having different relative strengths.

In a first implementation of such a balanced bitcell, the first area of the integrated circuit device and the second area of the integrated circuit device may be adjacent one another, having a boundary extending in a first direction, any line drawn through the first portion of the first transistor parallel to the boundary may pass through the first portion of the second transistor but not through the second portion of the first transistor, and any line drawn through the second portion of the second transistor parallel to the boundary may pass through the second portion of the first transistor but not through the first portion of the second transistor.

According to a first aspect of that first implementation, the integrated circuit device may be a finFET device and the physical features forming the diffusion regions of different relative strengths may include fins having different dimensions giving rise to different strengths, the first diffusion region of the integrated circuit device may have a first relative relationship to the fins of different strengths, and the second diffusion region of the integrated circuit device may have a second relative relationship to the fins of different strengths.

In accordance with implementations of the subject matter of this disclosure, a method of forming a balanced bitcell on an integrated circuit device, having physical features forming diffusion regions of different relative strengths, includes forming a first transistor having a first portion in the first area of the integrated circuit device in a first diffusion region and a second portion in the second area of the integrated circuit device in a second diffusion region, and forming a second transistor having a third portion the first area of the integrated circuit device in the second diffusion region and a fourth portion in the second area of the integrated circuit device in the first diffusion region, the first diffusion region of the integrated circuit device and the second diffusion region of the integrated circuit device having different relative strengths.

In a first implementation of such a method, when the first area of the integrated circuit device and the second area of the integrated circuit device are adjacent one another, having a boundary extending in a first direction, the method may include forming a first portion of the first transistor in the first area of the integrated circuit device, forming a second portion of the first transistor in the second area of the integrated circuit device, forming a first portion of the second transistor in the first area of the integrated circuit device, and forming a second portion of the second transistor in the second area of the integrated circuit device, such that any line drawn through the first portion of the first transistor parallel to the boundary passes through the first portion of the second transistor but not through the second portion of the first transistor, and any line drawn through the second portion of the second transistor parallel to the boundary passes through the second portion of the first transistor but not through the first portion of the second transistor.

According to a first aspect of that first implementation, when the integrated circuit device is a finFET device and the physical features forming diffusion regions of different relative strengths include fins of different strengths, the first diffusion region of the integrated circuit device has a first relative location to the fins of different strengths, and the second diffusion region of the integrated circuit device has a second relative location to the fins of different strengths, the method may include forming the first portion of the first transistor and the second portion of the second transistor at a first location relative to a fin of a first strength, and forming the second portion of the first transistor and the first portion of the second transistor at a second location relative to a fin of a second strength.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 1 is a schematic representation of an example of an integrated circuit device incorporating the subject matter of this disclosure;

FIG. 2 is a schematic representation of two bitcells in accordance with implementations of the subject matter of this disclosure;

FIG. 3 is a first nominal layout representation of the two bitcells of FIG. 2;

FIG. 4 is a second nominal layout representation of the two bitcells of FIG. 2;

FIG. 5 is a third nominal layout representation of the two bitcells of FIG. 2;

FIGS. 9A, 9B and 9C, collectively referred to as FIG. 9, is a schematic representation showing the coupling of bitcells in a PMOSFET implementation of the array of FIG. 7 to sensing circuitry in accordance with implementations of the subject matter of this disclosure;

DETAILED DESCRIPTION

Figure 6:
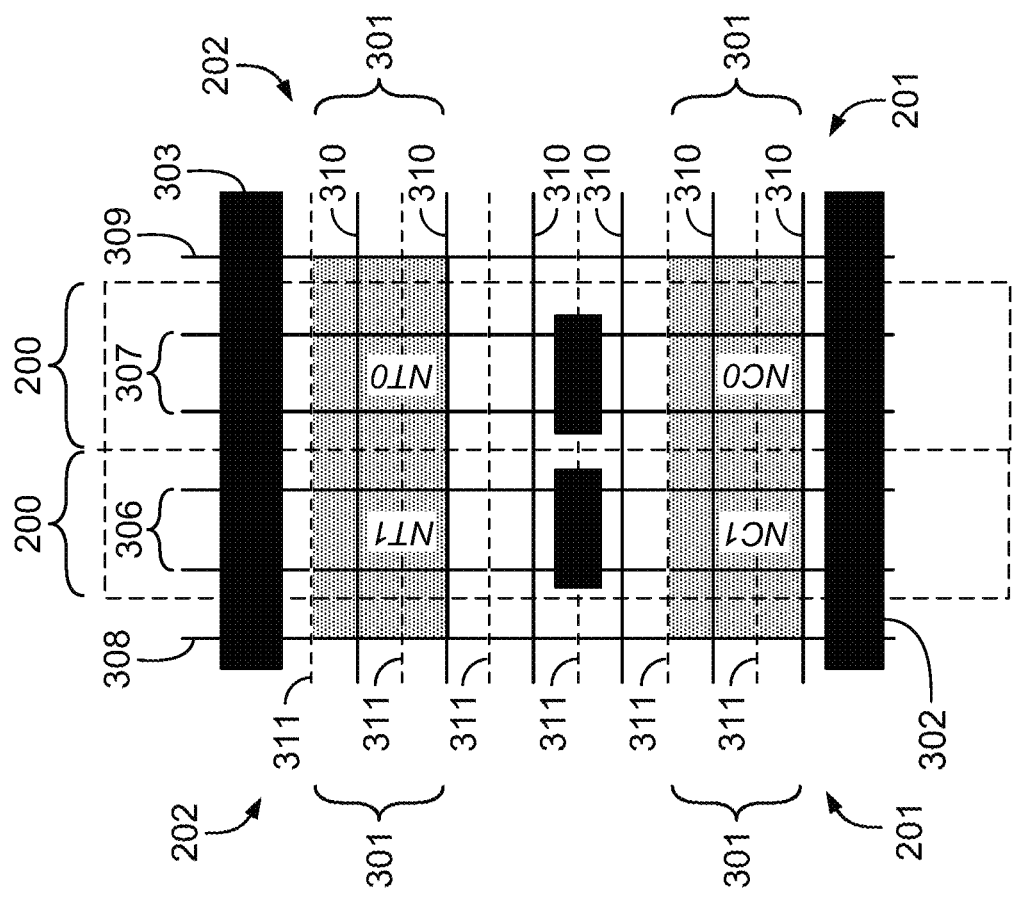
FIG. 6 is a fourth nominal layout representation of the two bitcells of FIG. 3.
Figure 7:
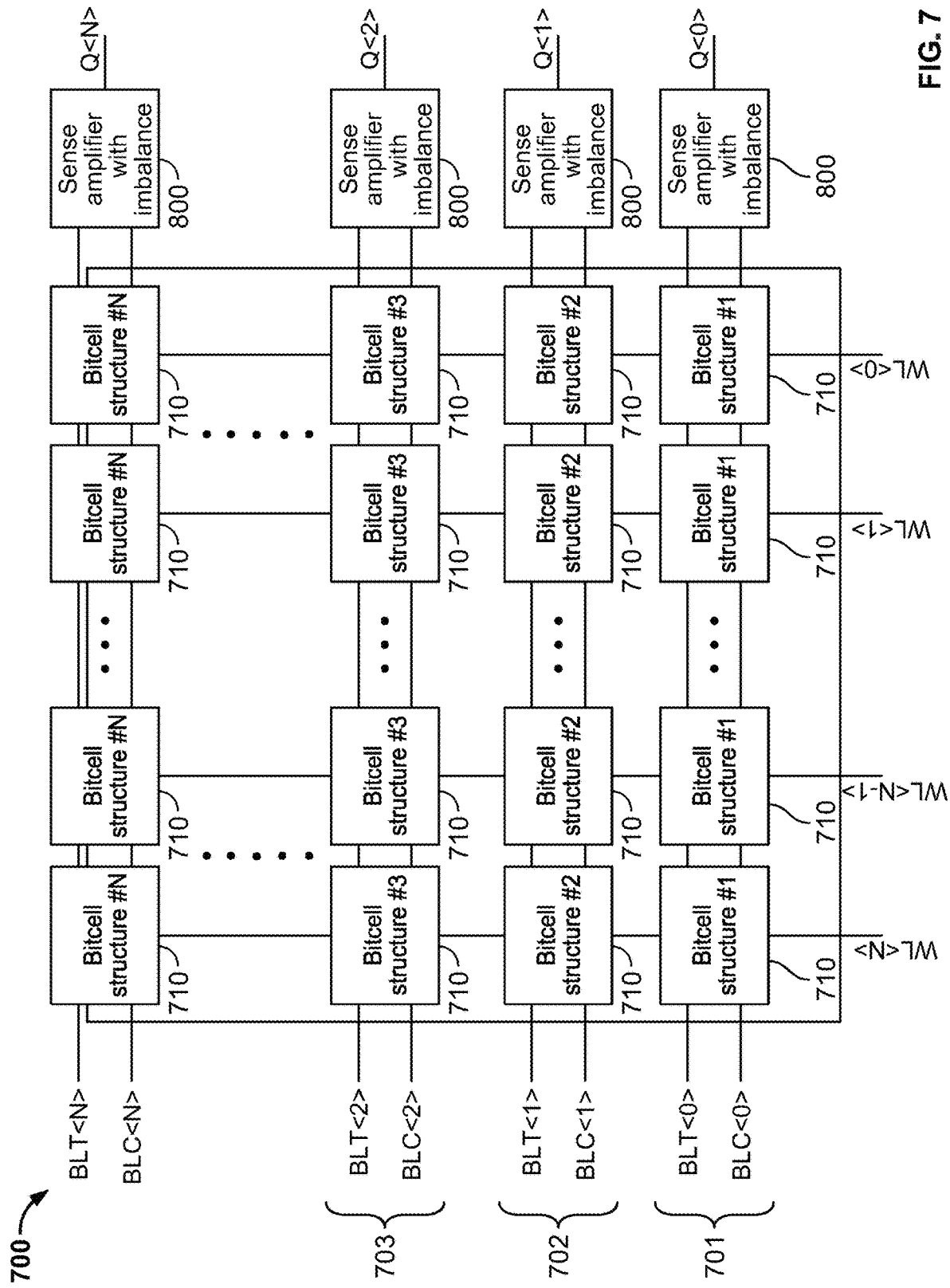
FIG. 7 is a schematic representation of an array of bitcells arranged as a test circuit in accordance with implementations of the subject matter of this disclosure.

As noted above, various artifacts of semiconductor processing conditions may affect the operation of components formed on a semiconductor device. While in most cases, the effects are small, the effects—even if small—may be significant in certain applications, such as those in which matched pairs of components (including, e.g., without limitation, transistors) are expected to be balanced in their performance. The magnitude of the effects may be a function of the layout of device components relative to certain physical features, but it is difficult to know in advance where to lay out the device components.

Therefore, in accordance with implementations of the subject matter of this disclosure, test structures may be formed on a semiconductor device to measure the effects of different component layouts. The performance of the test structures may be measured after fabrication, and may be used to adjust the layout of components on the semiconductor device in future iterations to improve the performance of those components.

For example, in the three-dimensional type of transistor commonly referred to as a finFET, if the fins are laid out with a separation distance below some threshold distance (which is dependent on the fabrication process used to form the semiconductor device on which the transistor is located), it may not be possible to form every fin in a single fabrication pass. Rather, it may be necessary to form every other fin, at twice the separation distance, and then make a second fabrication pass, also at twice the separation distance, but offset from the first pass by the separation distance. The resulting interleaved groups of fins from the two passes form a single set of fins separated by the separation distance, as intended. However, it may be that the fins formed during the two separate passes do not have identical characteristics—e.g., they may have different dimensions that result in different drive current capabilities (sometimes referred to as different "strengths").

One possible consequence of those different characteristics is that if the diffusion region forming a transistor is laid out in a first relationship to the fins—e.g., starting at a fin formed in the first pass—that transistor may have different performance characteristics than a transistor whose diffusion region is laid out in a second relationship to the fins—e.g., starting at a fin formed in the second pass. While the performance difference between the two transistors may not be significant if the transistors are operated independently, if the transistors are intended to operate as a balanced pair (e.g., in some form of memory or amplifier), the performance difference may cause an imbalance in the operation of the transistor pair, so that output of the transistor pair deviates from an expected output.

However, it has not heretofore been possible to know in advance how the layout, on a semiconductor device, of a particular semiconductor component will affect performance of that component.

Therefore, in accordance with implementations of the subject matter of this disclosure, test structures may be formed on a semiconductor device in different layout positions relative to physical features of the semiconductor device (as explained below). The performance of each of the test structures may then be examined and, for any particular component for which a test structure was provided, the layout with the best performance can be used to inform the placement of instances of that component on subsequent iterations of the semiconductor device. In such implementations, the test structures may be present on the initial test iteration of the semiconductor device, as well as early subsequent iterations of the semiconductor device. Once the design of the semiconductor device is finalized based, in part, on information gained from the test structures, the test structures would no longer be necessary. While the test structures could nevertheless be left in place in later production iterations of the semiconductor device, the test structures—because they would no longer be necessary—may be removed from those later production iterations of the semiconductor device.

There may be some situations where the semiconductor components being modeled by the test structures are field-adjustable—e.g., in a setup/programming mode, or by parameter adjustment during normal operation. Alternatively, the sensing circuitry in the test structures may be capable of adjusting the unbalanced output. Therefore, in some implementations of the subject matter of this disclosure, the test structures would be left in place in all production iterations, and output of the test structures could be used to adjust the semiconductor device.

For every test structure being tested, there may be multiple versions of that test structure. Each version may be positioned to reflect a different layout arrangement. Moreover, in order to avoid the effects of random fluctuations, there may be multiple copies (e.g., hundreds of copies) of each version of a test structure being tested. Therefore, the total number of test structures on a semiconductor device may be in the thousands. In some implementations, those test structures may be arranged in a rectilinear array. For example, the test structures may be arranged in rows and columns, where each row includes multiple copies of one version of a layout arrangement for one test structure, so that the results for that one version of that one test structure are statistically significant. Additional rows may be provided for additional versions of that test structure, while still other rows may be provided for versions of other test structures.

The different layout arrangements may result from different placements of components, or features of components, relative to other features on the semiconductor device. For example, in the context of a finFET device as described above, different layout arrangements for a transistor might reflect different placements of diffusion regions of the transistor relative to the different types of fins described above. In some cases, both the feature whose layout is being tested, and the feature relative to which the feature being tested is laid out, may be features of the same component. For example, where the component is a transistor pair, the layout arrangement being tested may be the placement of the gate contact relative to the diffusion regions defining the two transistors (where placement of those diffusion regions relative to fins of the device may itself be the subject of testing as just described).

Other layout arrangements that may be tested include the lengths of the diffusion regions defining the width of the channel, source and drain of the transistor, parameters (e.g., the distance from an active device to the edge) of PODE (polysilicon-on-diffusion-edge) "dummy gates," at the edges of the diffusion regions, that define the sides of the transistor (or other component), and the distances from the ends of the diffusion regions to polysilicon cuts (e.g., trenches) that define the ends of a transistor (or other component).

As noted above, the performance differences caused by layout arrangements may not be significant for individual components, but can be significant where pairs of components are expected to be balanced. For example, for some implementations, the functioning of a bitcell including two transistors may be predicated on the two transistors being balanced—i.e., producing the same outputs if their inputs are the same. As another example, in other implementations, pairs of resistors, or of other components such as capacitors or inductors (where the same value—e.g., resistance, capacitance or inductance—may be obtained with, e.g., different aspect ratios of the component), may be expected to be balanced. However, the remainder of this disclosure will concentrate on the example of a balanced pair of transistors.

Therefore, in some implementations, the array of test structures described above may be an array of balanced transistor pair cells. Each row of the array may be a differential bitline of the array, while each column of the array may be a word line of the array (or the columns may be the bitlines while the rows are the wordlines). Sense amplifier circuitry coupled to each bitline/row may be provided to sense when there is an imbalance in a transistor pair cell which has been selected by activating one of the word lines. Imbalance circuitry as described below may be included in the sense amplifier circuitry to facilitate sensing the imbalance in any one of a number of parameters including, but not necessarily limited to, current, voltage, capacitance or inductance.

The output of the sense amplifier circuitry may be directed to an output terminal of the semiconductor device, where it may be read by a device designer and used to adjust the layout of the components of the semiconductor device for a future iteration of the semiconductor device. Alternatively (or additionally), the output of the sense amplifier circuitry may be used to compensate for detected imbalance.

While the foregoing discussion has focused on testing the effects of different layout arrangements on the semiconductor device so that the effects may be compensated for, or may be mitigated in a future redesign of the semiconductor device, an alternative solution for mitigating potential mismatch in components of the semiconductor device, and particularly mismatch within matched pairs of transistors, is to construct the transistors in a manner that makes each transistor substantially insensitive or immune to the effects of different layout arrangements. For example, instead of laying out each transistor of a balanced transistor pair with its own diffusion regions, the two transistors of a balanced transistor pair may be laid out in an arrangement in which portions of both transistors share the same diffusion regions.

One such shared layout may be described as an "X-cell," discussed below, in which a first portion of the first transistor is located in a first area of the integrated circuit device, a first portion of the second transistor is located in a second area of the integrated circuit device, and those portions occupy a first diffusion region. A second portion of the second transistor is located in the first area of the integrated circuit device, a second portion of the first transistor is located in the second area of the integrated circuit device, and those portions occupy a second diffusion region. If the first and second areas have difference strengths or performance characteristics, the differences can be mitigated if any line, drawn through the first portion of the first transistor parallel to the boundary between the areas passes through the second portion of the second transistor but not through the second portion of the first transistor, while any line drawn through the second portion of the second transistor parallel to the boundary passes through the second portion of the first transistor but not through the second portion of the first transistor, because each transistor will share part of the first diffusion region having one strength or performance metric, and will share part of the second diffusion region having a different strength or performance metric.

The subject matter of this disclosure may be better understood by reference to FIGS. 1-12.

FIG. 1 is a schematic representation of an example of an integrated circuit device 100 incorporating the subject matter of this disclosure. Integrated circuit device 100 may include a plurality of functional circuit areas 101. Because the number and layout of functional circuit areas 101 will differ from device to device according to the required functions of the device, functional circuit areas 101 are indicated in phantom.

Test circuitry 102 in accordance with implementations of the subject matter of this disclosure may be included on integrated circuit device 100 in an area not otherwise used by any of the functional circuit areas 101. Frequently, the nature of any functional circuit areas 101 may be expected to leave a sufficiently large contiguous area for placement of test circuitry 102. However, in laying out integrated circuit device 100, it may be necessary to reserve a minimum area in the overall design for test circuitry 102.

As described above, the purpose of test circuitry 102 is to determine whether or how the functioning of semiconductor devices in functional circuitry 101 is affected by the layout of semiconductor structures (e.g., transistors) in functional circuitry 101 relative to physical structures of integrated circuit device 100 (including layout relative to other portions of the same semiconductor structure). While differences between nominally identical semiconductor structures may be of concern for all semiconductor structures on an integrated circuit device, such differences may be of greater concern when two semiconductor structures are use in what is supposed to be a balanced pair, such as the balanced transistor pair forming a bitcell 200 as shown in FIGS. 2 and 3, showing two bitcells 200 each coupled to a respective word line 203 and both coupled to a bitline 204, in schematic form (FIG. 2) and device layout form (FIG. 3).

Bitcell 200 includes two transistors 201, 202 and may resemble a typical bitcell used to store a single data bit. However, in some applications, bitcell 200 may be expected to be a "balanced" bitcell that is expected to have substantially equal probabilities of containing a '0' or a '1' based on, e.g., natural variations in dopant distributions (in the absence of user intervention). In such a balanced bitcell, transistors 201, 202 are physically close to one another, and share a common gate (both gate 211 and gate 212 are coupled to wordline 203) and a common source (both source 221 and source 222 are coupled to ground Vss. The respective drains 231, 232 of transistors 201, 202 are coupled for reading, respectively, to the bitline-complement (BLC) leg 214 and bitline-true (BLT) leg 224 of a differential bitline 204.

FIG. 3 is a representation of the physical layout, on a finFET device, of two sets 320, 330 of transistors, where each set includes a respective pair of transistors 201, 202, as may be used for the two bitcells 200 of FIG. 2. The drains and sources, and the channels therebetween, of respective transistors 201, 202 are formed in a semiconductor diffusion region 301. A respective Vss or ground connection formed behind the plane of the drawing is coupled to the sources of transistors 201, 202 in each respective transistor pair 320, 330. The ends of respective transistors 201, 202 are formed by cuts (e.g., trenches) 302, 303 in the polysilicon layer (sometimes referred to as "cut poly"), to prevent conduction of signals to neighboring semiconductor structures (e.g., other transistors).

A respective gate contact 304, 305 is provided in each transistor pair 320, 330. In transistor pair 320, gate contact 304 couples polysilicon active gate 306 to the diffusion regions 301 of the two transistors 201, 202 in transistor pair 320. In transistor pair 330, gate contact 305 couples polysilicon active gate 307 to the diffusion regions 301 of the two transistors 201, 202 in transistor pair 320. Polysilicon-on-diffusion-edge (PODE) "dummy gates" 308, 309 are provided at the edges of diffusion regions 301 to define the "sides" of transistors 201, 202.

As seen in FIGS. 3-6, various combinations of layout features may be tested. For example, solid horizontal lines 310 may represent fins of a first strength, while dashed horizontal lines 311 may represent fins of a second strength. In FIGS. 3, 4 and 6, the "bottom" edge (in the orientation of the drawings) of all diffusion regions 301 is located on a fin of the first strength. However, in FIG. 5, the bottom edge of diffusion regions 301 of transistors 201 in each pair 320, 330 is located on a fin of the first strength, but the bottom edge of diffusion regions 301 of transistors 202 in each pair 320, 330 is located on a fin of the second strength. Similarly, in FIGS. 3, 4 and 6 diffusion regions 301 of transistors 201 and 202 (in both pairs 320, 330) are separated by four inactive fins (five fin-to-fin spaces), while in FIG. 5, diffusion regions 301 of transistors 201 and 202 (in both transistor cell pairs 320, 330) are separated by three inactive fins (four fin-to-fin spaces). Finally, in FIGS. 3, 5 and 6, all gate contacts are halfway between respective diffusion regions 301 of transistors 201, 202 in both transistor cell pairs 320, 330, while in FIG. 4, gate contact 304 in transistor pair 320 is closer to the diffusion region 301 of transistor 201 and gate contact 305 in transistor pair 330 is closer to the diffusion region 301 of transistor 202.

The effects of all of these variations can be determined by having an array 700 (FIG. 7) of large numbers of transistor cell pairs 320, 330 in which all of the various layout features are varied. Thus, a first row 701 of array 700 may include a large number of bitcells 710 in which all diffusion regions 301 start on fins 310 of the first strength and are separated by a particular number of inactive fins, while the spacing of gate contacts 304, 305 from transistors 201, 202 vary. Additional rows may be used to test the variation of the separation between diffusion regions. Another row 702 of array 700 may include a large number of bitcells 710 in which all diffusion regions 301 start on fins 311 of the second strength and are separated by a particular number of inactive fins, while the spacing of gate contacts 304, 305 from transistors 201, 202 vary. Once again, additional rows may be used to test the variation of the separation between diffusion regions.

Figures 8A, 8B, 8C:
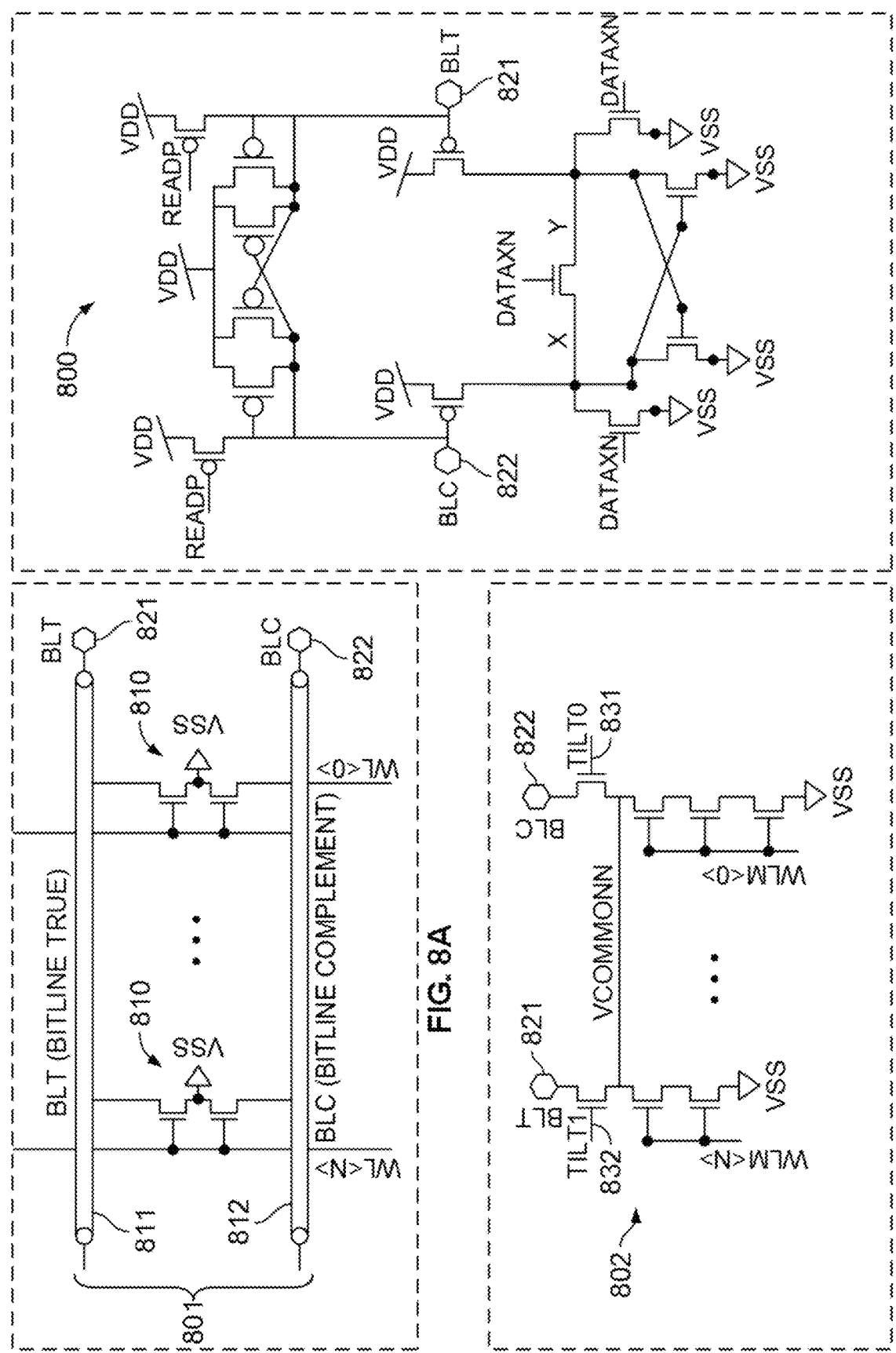
FIGS. 8A, 8B and 8C, collectively referred to as FIG. 8, is a schematic representation showing the coupling of bitcells in an NMOSFET implementation of the array of FIG. 7 to sensing circuitry in accordance with implementations of the subject matter of this disclosure.

In a third row 703, diffusion regions 301 of transistors 210 of bitcells 710 may start on fins 310 of the first strength while diffusion regions 301 of transistors 202 of bitcells 710 may start on fins 311 of the second strength. Additional rows may be provided to test the effect of varying 30 the separation between diffusion regions and the gate contact spacing.

Where the test array 701 is based on NMOSFET technology, the individual bitcells 810 may be coupled to a differential bitline row 801 as shown in FIG. 8A. Sense amplifier circuitry such as sense amplifier 800 (FIG. 8B), which may be a typical NMOSFET sense amplifier, may be coupled to the differential bitline conductors 811, 812 at BLT node 821 and BLC node 822, to measure whether there is any difference between, e.g., the voltage on bitline-true conductor 811 and the voltage on bitline-complement conductor 812 (ideally there would be no difference), represented by outputs X and Y.

Imbalance circuitry 802 (FIG. 8C) may be coupled to BLT node 821 and BLC node 822 and used to determine the degree of imbalance between the differential bitline conductors 811, 812. For example, the voltage that needs to be applied to TILT0 and TILT1 inputs 831, 832 to bias sense amplifier 800 remove the imbalance may be indicative of the magnitude of the imbalance. Knowledge of that imbalance can be used to mitigate the imbalance in the next fabrication iteration of integrated circuit device 100. Alternatively, the output of imbalance circuitry 802 (i.e., the voltage that needs to be applied to TILT0 and TILT1 inputs 831, 832 to remove the imbalance) may be used to control circuitry (e.g., via outputs Q<n>) that can adjust parameters of affected components to compensate for detected imbalance. More directly, the TILT0 and TILT1 inputs 831, 832 can be varied during normal operation to remove the imbalance.

Although the test cells in array 700, as well as the sense amplifier 800 are shown as being based NMOSFET technology, PMOSFET technology also can be used with the modifications shown in FIG. 9, where components are labelled with reference numerals corresponding to the reference numerals in FIG. 8, but beginning with "9" instead of "8."

As an alternative to detecting and/or correcting circuit imbalance, at least in the case where the imbalance affects a matched transistor bitcell, one may deploy a transistor bitcell structure 1000 (FIGS. 10 and 11) that is relatively immune to layout effects. The schematic representation 1001 of bitcell structure 1000 shown in FIG. 10 remains as a source-to-source coupling of two transistors 1101, 1102 with a common gate 1103, and drains coupled to respective bitline-true leg 1111 and bitline-complement leg 1112.

Figure 11:
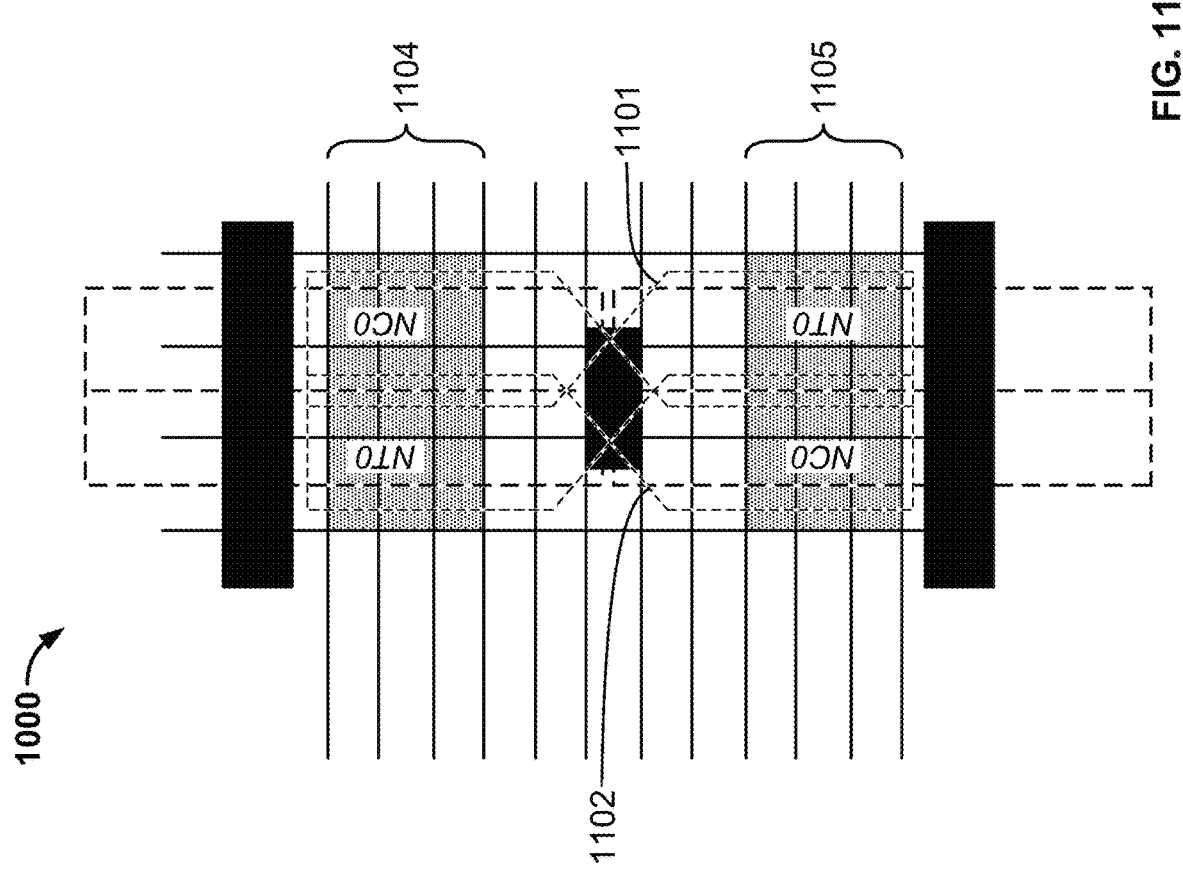
FIG. 11 is a layout representation of the bitcell structure of FIG. 10, that is immune to layout effects, in accordance with implementations of the subject matter of this disclosure.
Figure 10:
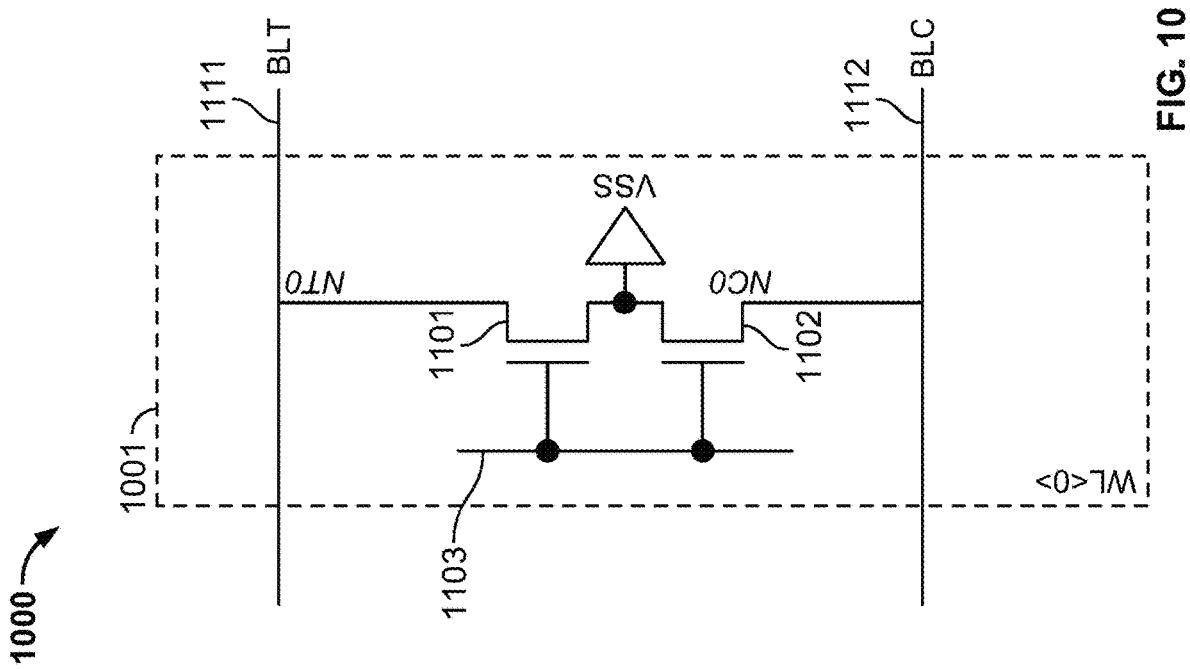
FIG. 10 is a schematic representation of a bitcell structure that is immune to layout effects, in accordance with implementations of the subject matter of this disclosure.

However, as shown in FIG. 11, the layout of each transistor 1101, 1102 is altered to form a bitcell structure which may be referred to as an "X-cell." Instead of forming each transistor 1101, 1102 in a separate one of diffusion regions 1104, 1105, a portion of transistor 1101 is formed in diffusion region 1104 and the remainder of transistor 1101 is formed in diffusion region 1105. Similarly, a portion of transistor 1102 is formed in diffusion region 1105 and the remainder of transistor 1102 is formed in diffusion region 1104.

Because each one of transistors 1101, 1102 is spread across the same two diffusion regions 1104, 1105, any imbalance between the two transistors 1101, 1102 is cancelled out. That is, even if the two diffusion regions 1104, 1105 have different relative strengths—e.g., based on their relative locations to fins of different strengths—the two transistors 1101, 1102 will have the same relative differences and therefore will remain balanced.

In some implementations of an X-cell, each respective transistor 1101, 1102 is laid out so that one-half of each respective transistor 1101, 1102 is formed in each diffusion region 1104, 1105, for effective cancellation of any imbalance. A first area 1113 of the integrated circuit device spanning diffusion regions 1104, 1105, and a second area 1114 of the integrated circuit device spanning diffusion regions 1104, 1105 adjacent to first area 1113 may be defined by a boundary extending in a first direction. A first portion 1121 forming half of first transistor 1101 may be formed in the portion of first area 1113 in diffusion region 1104 and a first portion 1122 forming half of second transistor 1102 may be formed in the portion of first area 1113 in diffusion region 1105, while a second portion 1131 of first transistor 1101 may be formed in the portion of second area 1114 in diffusion region 1105 and a second portion 1132 of second transistor 1102 may be formed in the portion of second area 1114 in diffusion region 1104.

Any line drawn through first portion 1121 of first transistor 1101 parallel to the boundary between first area 1113 and second area 1114 passes through first portion 1122 of second transistor 1102 but not through the second portion 1131 of first transistor 1101. Any line drawn through second portion 1132 of second transistor 1102 parallel to the boundary passes through second portion 1131 of first transistor 1101 but not through first portion 1122 of second transistor 1102. That is, first half 1121 of transistor 1101 is confined to first area 1113 and first diffusion region 1104, first half 1122 of transistor 1102 is confined to first area 1113 and second diffusion region 1105, second half 1131 of transistor 1101 is confined to second area 1114 and second diffusion region 1105, and second half 1132 of transistor 1102 is confined to second area 1114 and first diffusion region 1104, so that the contributions of each diffusion region 1104, 1105 to transistors 1101, 1102 are completely balanced.

Figure 12:
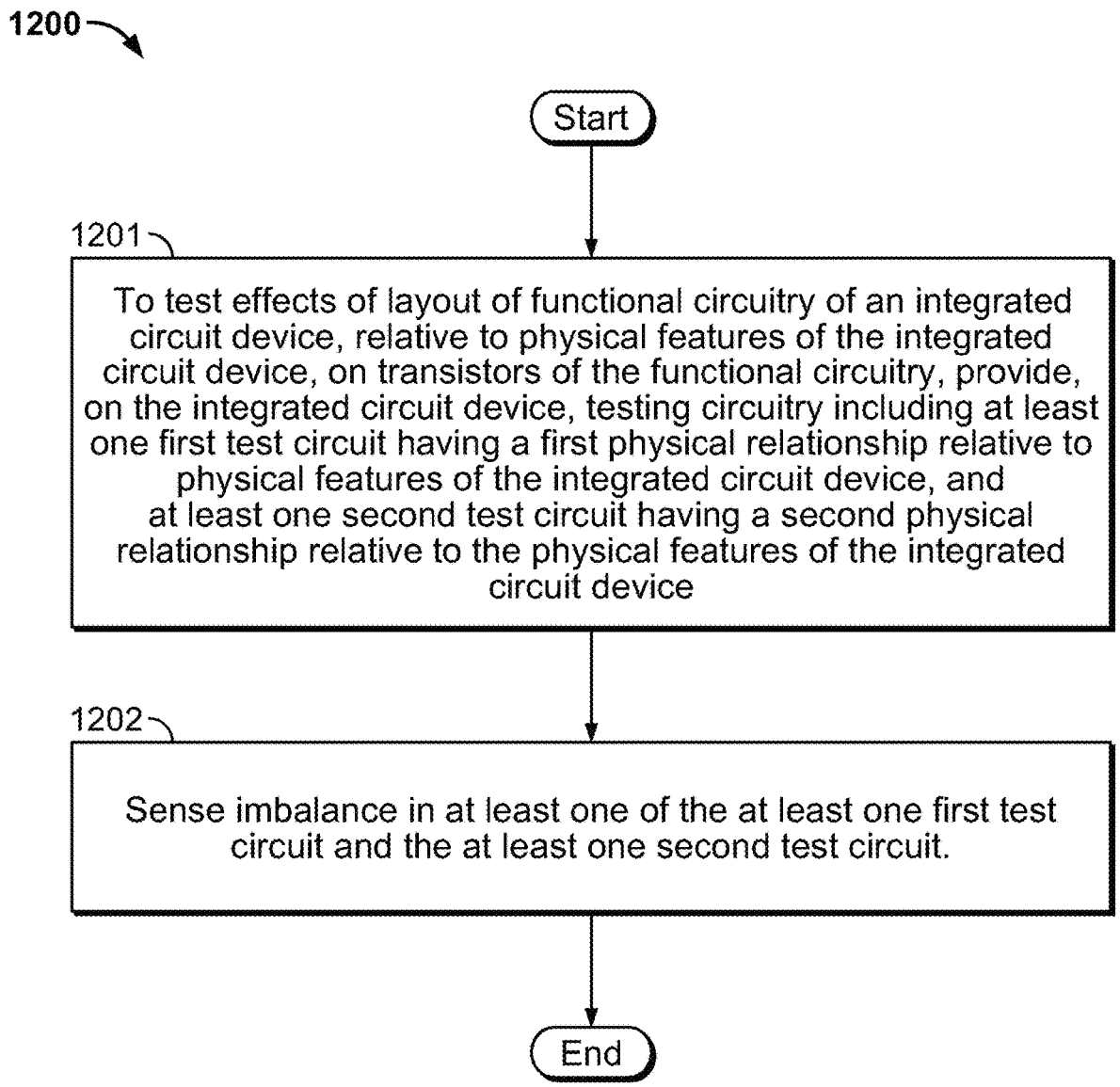
FIG. 12 is a flow diagram illustrating implementations of a method in accordance with the subject matter of this disclosure.

FIG. 12 is a flow diagram illustrating a method 1200 in accordance with implementations of the subject matter of this disclosure for testing effects of layout of functional circuitry of an integrated circuit device, relative to physical features of the integrated circuit device. Method 1200 begins at 1201 where testing circuitry, including at least one first test circuit having a first physical relationship relative to physical features of the integrated circuit device, and at least one second test circuit having a second physical relationship relative to the physical features of the integrated circuit device, is provided on the integrated circuit device. At 1202, imbalance is sensed in at least one of the at least one first test circuit and the at least one second test circuit. Method 1200 then ends.

Thus it is seen that built-in circuitry that allows testing of the effect of fabrication conditions of an integrated circuit device on components fabricated on that device, and especially the effects of different layout selections on the fabricated components, to allow compensation for those effects, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. An integrated circuit device comprising:
functional circuitry including transistors;
testing circuitry configured to test effects of different layouts of the functional circuitry, relative to physical features of the integrated circuit device, on operation of the transistors, the testing circuitry comprising:
at least one first test circuit having a first layout relationship relative to the physical features of the integrated circuit device,
at least one second test circuit having a second layout relationship, different from the first layout relationship, relative to the physical features of the integrated circuit device, and
sensing circuitry configured to read outputs of (a) the at least one first test circuit and (b) the at least one second test circuit; and
imbalance circuitry configured to apply compensation to the functional circuitry to compensate for an imbalance, between the output of the at least one first test circuit and the output of the at least one second test circuit, resulting from a difference between the first layout relationship and the second layout relationship.

2. The integrated circuit device of claim 1, wherein:
the at least one first test circuit comprises a plurality of instances of the first test circuit; and
the at least one second test circuit comprises a plurality of instances of the second test circuit.

3. The integrated circuit device of claim 2, wherein the plurality of instances of the first test circuit, and the plurality of instances of the second test circuit are part of an array including instances of additional test circuits.

4. The integrated circuit device of claim 1, wherein:
the integrated circuit device is a finFET device; and
the physical features comprise fins of different strengths.

5. The integrated circuit device of claim 1, wherein the physical features comprise gate contact locations.

6. The integrated circuit device of claim 1, wherein the physical features comprise lengths of diffusion regions.

7. The integrated circuit device of claim 1, wherein the physical features comprise polysilicon cuts that define ends of transistors.

8. The integrated circuit device of claim 1, wherein:
at least one of the at least one first test circuit and the at least one second test circuit comprises a balanced twin-transistor bitcell, including two nominally identical transistors sharing a common gate and a common source; and
the sensing circuitry comprises a sense amplifier.

9. The integrated circuit device of claim 8, wherein:
the sense amplifier is configured to detect imbalance between response of a selected parameter in (a) a first of the two nominally identical transistors and (b) a second of the two nominally identical transistors; and
the imbalance circuitry is configured to measure the imbalance and apply compensation for the imbalance to the functional circuitry.

10. The integrated circuit device of claim 9, wherein the imbalance circuitry is configured to measure the imbalance by determining a bias voltage that negates the imbalance, and to apply that bias voltage to the functional circuitry.

11. The integrated circuit device of claim 9, wherein the selected parameter is one of current, voltage, capacitance, and inductance.

12. A method of testing effects of layout of functional circuitry of an integrated circuit device, relative to physical features of the integrated circuit device, on transistors of the functional circuitry, he method comprising:
providing, on the integrated circuit device, testing circuitry including:
at least one first test circuit having a first layout relationship relative to physical features of the integrated circuit device, and
at least one second test circuit having a second layout relationship, different from the first layout relationship, relative to the physical features of the integrated circuit device;
sensing imbalance between an output of the at least one first test circuit and an output of the at least one second test circuit; and
applying compensation to the functional circuitry to compensate for a sensed imbalance, between the output of the at least one first test circuit and the output of the at least one second test circuit, resulting from a difference between the first layout relationship and the second layout relationship.

13. The method of claim 12, wherein, for each respective one of the at least one first test circuit and the at least one second test circuit, sensing imbalance comprises sensing imbalance between response of a selected parameter in a first of two nominally identical components of the respective one of the at least one first test circuit and the at least one second test circuit, and a second of the two nominally identical components of the respective one of the at least one first test circuit and the at least one second test circuit.

14. The method of claim 13, wherein sensing imbalance comprises sensing imbalance in at least one of current, voltage, capacitance, and inductance.

15. The method of claim 12, wherein applying compensation comprises adjusting circuit parameters to compensate for the imbalance.

16. The method of claim 12, wherein applying compensation comprises redesigning the integrated circuit device to mitigate the imbalance.

17. The method of claim 16, wherein, when the integrated circuit device is a finFET device and the physical features comprise fins of different strengths, redesigning the integrated circuit device to mitigate the imbalance comprises moving layout location of transistors of the functional circuitry relative to the fins.

18. The method of claim 16, wherein, when the physical features comprise gate contact locations, redesigning the integrated circuit device to mitigate the imbalance comprises changing the gate contact locations.

19. The method of claim 12, wherein, when the physical features comprise lengths of diffusion regions, redesigning the integrated circuit device to mitigate the imbalance comprises changing the lengths of diffusion regions.

20. The method of claim 12, wherein, when the physical features comprise polysilicon cuts that define transistor edges, redesigning the integrated circuit device to mitigate the imbalance comprises moving the polysilicon cuts relative to diffusion regions of the transistors.

* * * * *